(No Model.)
C. D. HOWARD
AUTOMATIC DRAFT REGULATOR.
No. 469,185. Patented Feb. 16, 1892.
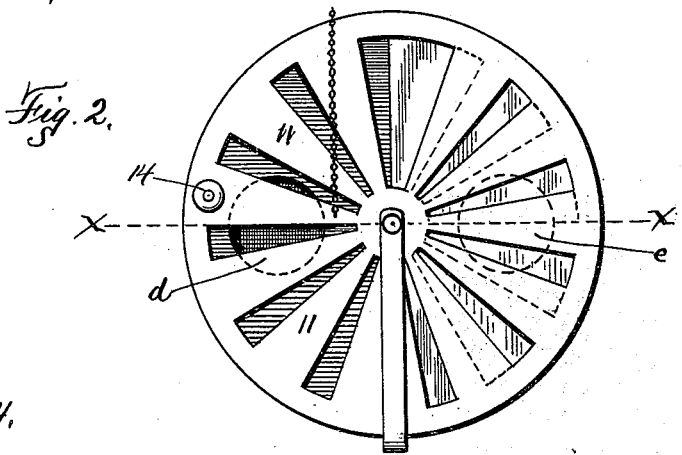
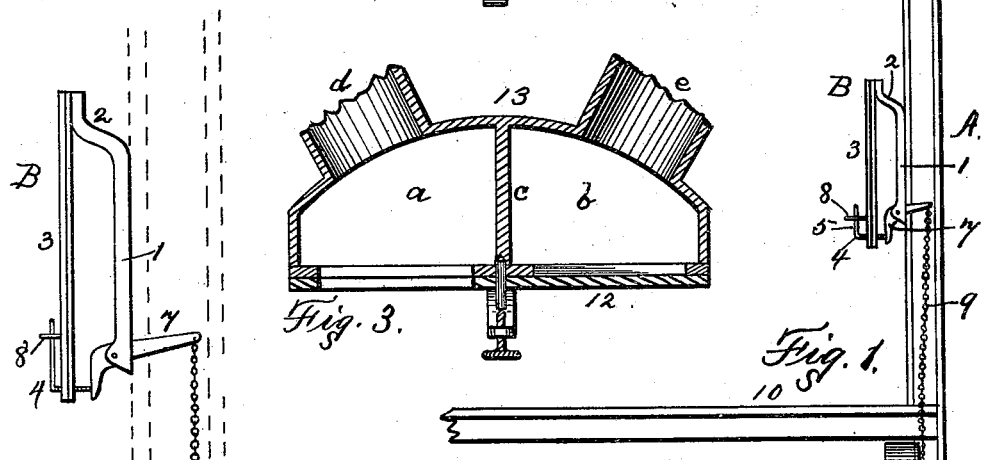
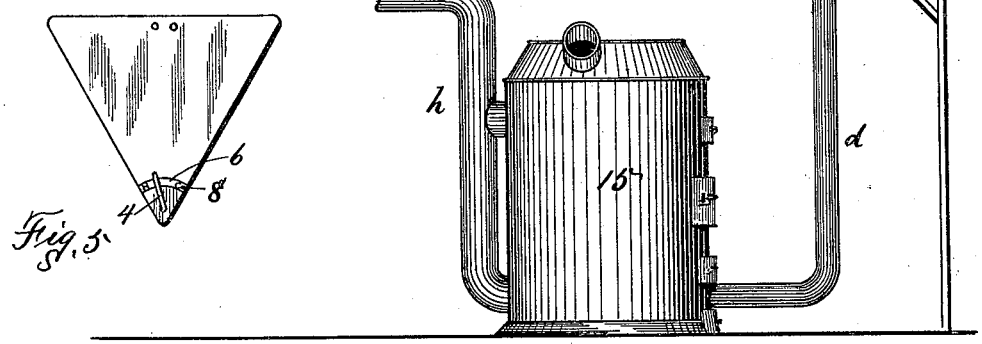
WITNESSES:
INVENTOR
Charles D. Howard
BY
Smith & Denison
his ATTORNEYS

UNITED STATES PATENT OFFICE.

CHARLES D. HOWARD, OF SYRACUSE, NEW YORK, ASSIGNOR TO THE HOWARD THERMOSTAT COMPANY.

AUTOMATIC DRAFT-REGULATOR.

SPECIFICATION forming part of Letters Patent No. 469,185, dated February 16, 1892.

Application filed June 8, 1891. Serial No. 395,463. (No model.)

*To all whom it may concern:*

Be it known that I, CHARLES D. HOWARD, of Syracuse, in the county of Onondaga, in the State of New York, have invented new and useful Improvements in Automatic Draft-Regulators, of which the following, taken in connection with the accompanying drawings, is a full, clear, and exact description.

My invention relates to thermostatic devices for controlling the direct and check drafts of heating apparatus automatically by the deflection of the thermostatic bar, constructed of materials of different expansible properties, caused by different degrees of temperature, such deflection being transmitted to the direct draft-damper or check-draft damper by means of connections actuated by the deflection.

The object of my invention is to produce a thermostatic draft-regulator in which the thermostatic bar, constructed of materials of different expansible properties, operates through the intermediate connections, engaging with its lower end and actuated thereby, to rotate a radially-slotted disk, and thereby alternately open and close on the one side the direct draft and on the other side the check-draft, the action of the thermostatic bar being also adjustable for different degrees of heat and cold, giving greater draft in cold weather than in moderate weather and greater check in moderate weather than in extreme cold weather.

My invention consists in the several novel features of construction hereinafter described, and which are specifically set forth in the claims hereunto annexed. It is constructed as follows, reference being had to the accompanying drawings, in which—

Figure 1 is a side elevation of the apparatus connected to a heating-furnace and ready for use. Fig. 2 is an enlarged front elevation of the radially-slotted disk in front of the draft-box. Fig. 3 is a section on line $xx$ in Fig. 2. Fig. 4 is a side elevation of the thermostatic bar, its support, the crank-arm, and part of the chain, together with the adjusting device. Fig. 5 is a front elevation of the thermostat and the adjusting-arm upon the lower end thereof.

A represents a partition, upon the inner side of which the thermostat B is fastened by means of screws through the bar 1, provided with an arm 2 at its upper end, to which the thermostatic bar 3 is rigidly secured, and this bar is constructed of materials of different expansible properties, such as rubber and brass, in this instance the brass being on the right or inner face. A screw 4, having an arm 5, is inserted through the lower end of the thermostat, said arm having relation to a scale 6 upon the thermostat, upon which the letters H and C represent, respectively, "hot" and "cold," and the inner end of this screw engages with the downward arm of the crank-lever 7, which is pivotally mounted in the lower end of the bar 1. The stop-pin 8 is secured in the base of the thermostatic bar adjacent to C. A chain 9 is connected to the inner arm of the crank-lever 7, which arm is here shown as projecting within the partition, and the chain also passing down within it and through the floor 10, and its lower end is secured to one of the radial bars 11 of the disk 12, which is placed across the front of the draft-box 13. The slotways between the radial bars create the draft-openings, and these slotways are so disposed that when, as shown in Fig. 2, the direct-draft slotways on the left are open the check-draft slotways on the right are closed, as indicated by the dotted lines. A counterbalance-weight 14 is secured upon one of the radial bars to cause it to return to its normal position after being opened by the lifting up of the chain, induced by the expansion of the thermostatic bar, which rotates the disk 12 upon its arbor. The draft-box 13 is divided into two compartments $a\ b$ by the vertical partition $c$, the compartment $a$ being the direct-draft compartment and the compartment $b$ being the check-draft compartment. A pipe $d$ conducts draft from the compartment $a$ into the furnace 15 below the fire. A pipe $e$ conducts the check-draft from the draft-box to the smoke-pipe $h$.

The operation of this device is as follows: When the thermostatic bar is expanded, causing a deflection to the right, the screw 4 raises the inner end of the lever 7, and this rotates the disk 12 upon its arbor, opening the check-draft opening on the right and closing the direct-draft opening on the left. When this operation is reversed and the thermostatic bar returns to its normal position, the direct-draft openings on the left will be opened, while the check-draft openings on the right will be closed. To adjust the action of this thermostatic bar, I vary the projection of the point of the screw 4 inward beyond the bar by turning the screw over to the right when it comes against the stop-pin 8, or turn it to the left to quicken its operation and give more heat. I can turn it, if desired, clear around to the left and under and up against the stop-pin 8, which gives me the maximum action of the thermostatic bar. This bar is constructed in the form shown for the purpose of giving the greatest strength of thermostatic action to the bar and greater deflection of the point or lower end incident to the shape. It will be seen from the drawings, Fig. 4, that by making the arms of the lever 7 of unequal length and having the screw 5 adapted to bear against the short arm the deflection or the effect of the deflection of the thermostat is multiplied, thus giving greater swing or rotation to the slotted disk and making it more positive in its action. It will be seen, also, that through the automatic operation of this device the temperature of a house can be maintained night and day at a given temperature, one room being selected as a standard and in which the thermostat is placed, and that consequently the furnace requires no attention beyond supplying it with coal and removing the ashes, all of which make the device one of the greatest utility. It works just the same whether the household is asleep or awake.

What I claim as my invention, and desire to secure by Letters Patent, is—

1. The combination, with a heating-furnace and its ash-pit and smoke-pipe, of a thermostatic bar constructed of materials possessing different expansible properties and having one end secured to a supporting-frame, a lever pivotally mounted in said frame, an adjusting-screw inserted through the free end of the thermostatic bar and bearing against one arm of said lever, a draft-box divided into compartments and having a radially-slotted front, a radially-slotted disk pivoted upon the front of said box, a chain connected to said disk and to the inner arm of said lever, and separate pipes leading from the respective compartments to said ash-pit and smoke-pipe.

2. A draft-box divided into compartments, a radially-slotted disk upon the front of said box, pipes leading from the compartments to the heating apparatus, a counter-balance upon said disk, and the thermostatic bar and connections between it and said disk, actuated by said bars to rotate the disk to open one compartment and close the other simultaneously, in combination as set forth.

In witness whereof I have hereunto set my hand this 4th day of June, 1891.

CHARLES D. HOWARD.

In presence of—
HOWARD P. DENISON,
C. B. KINNE.